(12) United States Patent
Büttiker

(10) Patent No.: US 6,738,912 B2
(45) Date of Patent: May 18, 2004

(54) METHOD FOR SECURING DATA RELATING TO USERS OF A PUBLIC-KEY INFRASTRUCTURE

(76) Inventor: Daniel Büttiker, Obergasse 7/9, CH-8400 Winterthur (CH)

( * ) Notice: Subject to any disclaimer, the term of this patent is extended or adjusted under 35 U.S.C. 154(b) by 261 days.

(21) Appl. No.: 09/893,413

(22) Filed: Jun. 29, 2001

(65) Prior Publication Data

US 2002/0188848 A1 Dec. 12, 2002

(51) Int. Cl.$^7$ ................................................ H04L 9/00
(52) U.S. Cl. ....................... 713/201; 713/202; 713/158; 380/241
(58) Field of Search ................................. 713/200, 201, 713/202, 155, 156, 165, 178, 193, 181, 158; 710/31, 36; 380/279, 231, 241, 278

(56) References Cited

U.S. PATENT DOCUMENTS

| | | | |
|---|---|---|---|
| 4,405,829 A | | 9/1983 | Rivest et al. |
| 5,343,529 A | * | 8/1994 | Goldfine et al. ............... 380/23 |
| 6,018,724 A | * | 1/2000 | Arent ............................ 705/4 |
| 6,092,201 A | * | 7/2000 | Turnbull et al. ............. 713/201 |
| 6,118,874 A | * | 9/2000 | Okamoto et al. ............. 380/282 |
| 6,192,131 B1 | * | 2/2001 | Geer, Jr. et al. ............. 380/283 |
| 6,202,151 B1 | | 3/2001 | Musgrave et al. |
| 6,216,116 B1 | * | 4/2001 | Barkan et al. ................. 705/76 |
| 6,332,193 B1 | * | 12/2001 | Glass et al. .................. 713/170 |
| 6,505,193 B1 | * | 1/2003 | Musgravae et al. ............ 707/3 |
| 6,510,513 B1 | * | 1/2003 | Danieli ....................... 713/156 |

OTHER PUBLICATIONS

Dorf, The Electrical Engineering Handbook, 2$^{nd}$ Edition, CRC–Press, Boca Raton 1997.

Branchaud, A Survey of Public–Key Infrastructures, Department of Computer Science, McGill University, Montreal 1997.

PKCS #10 Standard, Certification Request Syntax Standard, RSA Laboratories May 2000.

Ellison et al., Ten Risks of PKI: What You're not Being Told about Public Key Infrastructure, Computer Security Journal, vol. XVI, No. 1, Computer Security Institute 2000.

Menezes et al., Handbook of Applied Cryptography, CRC–Press, Boca Raton 1997.

* cited by examiner

Primary Examiner—Jeffrey Gaffin
Assistant Examiner—Rijue Mai
(74) Attorney, Agent, or Firm—Oliff & Berridge, PLC

(57) ABSTRACT

The inventive method allows to secure data relating to users of a public key infrastructure who may present certificates (11) at an institution (30) in order to initiate transactions. For this purposes the institution (30) uses and securely stores a secret key or a key pair which is designed for encrypting and decrypting data. Based on an agreement between a certificate holder and the institution (30), corresponding relational data are generated. Then said relational data are encrypted with the institution's (30) secret key or the first key of said key pair. Subsequently the encrypted relational data are integrated into the certificate (11) which preferably adheres to ITU recommendation X.509 version 3. At a later stage, whenever the certificate holder contacts the institution (30) in order to initiate a transaction based on said agreement between the certificate holder and the institution (30), encrypted relational data contained in the certificate (11) is decrypted by means of the secret key or the second key of said key pair of the institution (30). Based on the decrypted relational data, data stored in a directory (33) of the institution (30) can be verified and the requested transaction be performed.

13 Claims, 3 Drawing Sheets

METHOD FOR SECURING DATA RELATING TO USERS OF A PUBLIC-KEY INFRASTRUCTURE

The present invention relates to a method for securing data relating to users of a public key infrastructure according to claim 1.

The present invention relates in particular to a method for securing data which are based on relations between certificate holders and institutions or closed user groups.

More particularly the present invention relates to a method for securing relational data, based on which, for example, business transactions are performed or access to a system may be granted by using an open, public certificate while privacy of the relations between certificate holders and institutions can be maintained.

BACKGROUND OF THE INVENTION

The emergence of the World wide Web access to the Internet has been accompanied by recent focus on financial transaction vulnerabilities, crypto system weaknesses and privacy issues. Fortunately, technological developments also made a variety of controls available for computer security including tokens, biometric verifiers, encryption, authentication and digital signature techniques using preferably asymmetrical public-key approaches (see [1], Richard C. Dorf, THE ELECTRICAL ENGINEERING HANDBOOK, 2nd Edition, CRC-Press, Boca Raton 1997, chapter 97, pages 2221–2234 and [7], A. Menezes, P. van Oorschot, S. Vanstone, HANDBOOK OF APPLIED CRYPTOGRAPHY, CRC-Press, Boca Raton 1997, chapter 1).

The basic objectives of encryption are secrecy, authentication (assurance of sender identity to recipient), and digital signatures (authentication plus assurance to sender and third parties that the signature had not been created by the recipient). This is normally referred to as non-repudiation, with further variants such as non-repudiation of origin, non-repudiation of sending and so on. Of further importance is integrity which means preventing interference in the information conveying process.

Almost all cryptosystems involve publicly known transformations of information, based on one or more keys, at least one of which is kept secret. The public-key cryptosystem disclosed 1976 by Diffie and Hellman is based on two keys, a private-key and a public-key, owned by users of this system.

As described in [2], U.S. Pat. No. 4,405,829 for the RSA cryptosystem explained below, the public-key cryptosystem provides enciphered communication between arbitrary pairs of people, without the necessity of their agreeing on an enciphering key beforehand. The Diffie and Hellman system also provides a way of creating for a digitised document a recognizable, unforgeable, document-dependent, digitised signature whose authenticity the signer cannot later deny.

The RSA cryptosystem (named after R. L. Rivest, A. Shamir and L. M. Adleman which in [2] are mentioned as inventors) is the most widely used public-key cryptosystem. RSA is a commutative transformation, which allows the private-key and the corresponding public-key to be used interchangeably as encryption and decryption keys, thus providing secrecy and authenticity on a secure channel between two parties A and B with no need for additional keys (see [1], pages 2225–2226).

Since, given only one key of an asymmetric key pair, it is practically infeasible to determine the other key, an owner A of a key pair may publish his public-key so that anyone can use this public-key to encrypt a message that only A can decipher with his private-key.

As described in [3], Marc Branchaud, A SURVEY OF PUBLIC-KEY INFRASTRUCTURES, Department of Computer Science, Mc Gill University, Montreal 1997, page 5, computing with public-key ciphers takes much longer than encoding the same message with a secret-key system. This has led to the practice of encrypting messages with a secret-key system such as DES and then encoding the secret-key with a public-key system such as RSA. In this case the public-key system securely transports the secret-key. In case that a message is sent secretly from A to B then, besides a secret-key, which is used optionally, only the key pair of B is used.

The described public-key system also allows owner A to sign a message to be sent to B with a digital signature. In this case the key pair of A is used. A encrypts the message or a corresponding hash of the message with his private-key which, on the other side of the transmission channel can be decrypted by B using A's public key. One key pair can therefore be used to receive an encrypted message or to send a digitally signed message.

B (and any third parties), who can decrypt with A's public-key a message signed by A, can therefore trust that A has signed the message as far as D can trust that the selected public-key truly belongs to A.

In order to ensure that public-keys can systematically be published and truly relate to the persons A, B, . . . indicated by attached public-key values, registration- and certification authorities (RA, CA) have been introduced to certify the relationship between a given key and a claimed identity.

According to [3], page 10 a public-key infrastructure, in its most simple form, is a system for publishing public-key values used in public-key cryptography. There are basic operations, namely registration, certification and validation, which are common to all public-key infrastructures.

Certification is the means by which registered public-key values, and information pertaining to those values, are published. A basic certificate therefore contains at least the public-key of the concerned subject, subject identification information, and identification information of the certifying authority.

The certificate is signed by the certifying authority with the certifying authority's private-key and can be validated with the publicly known public-key of the certifying authority. In other words a certificate is therefore an encyrypted message issued by the certifying authority declaring that the therein contained public-key relates to the enclosed subject identification information.

As described in [3], pages 19–21, authentication is a process provided by a public-key infrastructure. When a certifying authority certifies an entity and a user then validates that certification, the entity is said to have been authenticated.

The degree to which a user can trust the certificate's information and it's validity is a measure of the strength of the authentication.

[4], U.S. Pat. No. 6,202,151 B1 describes a biometric certification system and method which implement an end-to-end security mechanism binding the biometric identification of consumers with digital certificates.

Users can also be authenticated through something possessed such as a token or a smart card. Tokens are, as described in [1], pages 2228–2229, hand-carried devices that are normally intended to increase password security by assuring that passwords are used only once, thereby reducing the vulnerability to password compromise. Tokens may contain internally an algorithm, which either works in synchronisation with an identical algorithm in a host computer or which transform an input derived from a computer prompt into a password that matches the computer-transformed result. In a public-key infrastructure a token containing a private-key may used to sign a message as described above.

The degree of authentication of a user by means of a token is however in many cases not strong enough. A man, to which the token had been assigned, may, rightfully or not, deny at a later stage that the token actually belongs to him.

In order to significantly increase the degree of authentication, in the not yet published European Patent Application No. 01810513.0 it is proposed to register users by means of a token or an other secure device at an authority, preferably the registration authority of a public-key infrastructure based on credentials, including signed biometric data presented to said authority.

The biometric data are signed by means of a private key issued individually by the registration authority automatically for each token. In addition to signing the biometric data with the private key of the registration authority the data can further be signed with the user's private key contained in the token.

After registration the token is a secure element of the public-key infrastructure allowing to encrypt messages and securely sign messages, with digital signatures, on which a third party can rely on.

It therefore seems that the basic objectives of encryption mentioned before, secrecy, authentication, digital signatures and integrity are achieved by applying the technology described above.

However the use of public key infrastructures still involves risks which are described in [6], Carl Ellison and Bruce Schneier, Ten Risks of PKI: What You're not Being Told about Public Key Infrastructure, Computer Security Journal, Volume XVI, Number 1, 2000.

For an institution such as bank institute a first risk i.e. question mentioned in [6] is, whom the institution can trust. Further risks or questions are derivatives of this question asking, whether the institute can trust the certification authority or rely on certification processes.

Important is the question, whether the authenticated person, for example OLIVIER HOLDER, is actually the person who is presenting the certificate. With the incorporation of the user's biometric data into the certification process it can be trusted that OLIVIER HOLDER is correctly authenticated. However the question remains whether OLIVIER HOLDER, with whom the institution is connected over a communication channel, is actually the man with whom the institution formerly communicated or whether it is a different person with the same name. In this respect in [6] also the security of the verifying computer is discussed. For example an attacker could add his own public key to the list of public keys maintained in institution, so that he could issue his own certificates, for example issued on the name of OLIVIER HOLDER, which would be treated exactly like legitimate certificates.

In view of relating a calling client, such as OLIVIER HOLDER, to the correct one among one or more clients with the same name, an institution normally uses a mapping list (see FIG. 1, 32), which maps data retrieved from a certificate to records of a customer database such as the directory 33 shown in FIG. 1. Besides the question whether the certificate from which data is used for mapping purposes, a new question arises, which has not been addressed in [6]. The question is, can the institution trust itself? For the bookkeeper of a bank institute it makes little difference whether a person internal or external to the institution is responsible for an illegal transfer of a million dollars. Therefore in case that the institution is perfectly shielded against external attackers it is still possible that the mapping list or the customer database has been manipulated by an internal attacker.

It would therefore be desirable to reduce the described risks thus improving public-key infrastructures.

It would be desirable in particular to improve overall system reliability, in particular authentication and data integrity.

More particularly it would be desirable to provide a method for securing relational data based on which business transactions are performed by an institution which acts according to instructions received by said certificate holder. In fact it would be desirable that the institution be removed from as many issues as possible concerning liability within an open, public key infrastructure, so that the institution is only responsible for the internal processing and security of any data belonging or related to its customer and does not need to rely on a trusted third party.

It would further be desirable to achieve the described objects with practically no significant investments and efforts by the institution and the certificate holders.

SUMMARY OF THE INVENTION

The above and other objects of the present invention are achieved by a method according to claim 1.

The inventive method allows the securing of data related to users of a public key infrastructure, who may present certificates at an institution in order to initiate transactions. For this purposes the institution preferably uses and securely stores a secret key or a key pair which is designed for encrypting and decrypting data.

Based on a request of a client, who is the holder of a certificate, an institution may allow the certificate holder to base future transactions or system access on his certificate. According to security regulations implemented, the institution will preferably verify that the person who is presenting the certificate is the actual owner for whom the certificate had been issued. The institution will further verify whether the certificate holder relates to a registered user or contract holder with the institution, and will demand corresponding proof of this relationship.

Based on an agreement or a contract closed between a certificate holder and the institution, corresponding relational data are generated. Then said relational data are encrypted preferably with the institution's first key of an asymmetric key pair such as a private/public key pair.

Subsequently the encrypted relational data are integrated into the certificate, which preferably adheres to ITU recommendation X.509 version 3. The relational data could be included in the certificate as a non-standard certificate extension.

At a later stage, whenever the certificate holder contacts the institution in order to initiate a transaction based on said agreement between the certificate holder and the institution, encrypted relational data contained in the certificate is decrypted by means of the secret key or the second key of said key pair of the institution.

Since the certificates, into which relational data are integrated, are elements of the public key infrastructure, other processes provided in this infrastructure are also performed whenever a certificate is presented. In case that an authentication of a certificate holder fails, for example due to expiration of the certificate, then the inventive method would not be applied.

The inventive method therefore allows institutions to integrate relational data into the certificate of a certificate holder, in the form of specific attributes defined and recognized by that institution. These institutional attributes are encrypted by the institution and can only be decrypted by the institution again.

The encryption and decryption of relational data can be performed by means of a single secret key (see [3], page 4) since the encrypted relational data corresponds to a message which is written and read by the same party i.e. the institution only. A transfer of the secret key across the network from a sender to receiver is therefore not required.

However in order to increase security internally in the institution a key pair could be used with one key held in a registration department, where relational data are encrypted, and the other key held securely stored in another department, for example where transactions are handled. Said keys correspond to a private key and a public key of the public key infrastructure although preferably both of these keys are not published.

A holder of a certificate opens for example an account at an institution, for example a bank, which, based on an agreement of terms regarding said account generates relational data which then is integrated in encrypted form into the certificate.

This enables the institution to identify and authenticate a certificate holder in a much stronger fashion than would be possible without the additional institutional attributes. In case that the certificate passes standard authentication, it is established that the certificate belongs for example to an OLIVIER HOLDER. Decrypting the encrypted relational data contained in the certificate confirms the identity of OLIVIER HOLDER, and indicates what relations exist between OLIVIER HOLDER and the institution. In case that several persons with the name HOLDER are registered at the institution, it is simultaneously established which one of these persons is concerned.

In order to prevent transfer of encrypted relational data i.e. of an institutional attribute from an original certificate to a certificate used by an attacker, said encrypted relational data are strongly linked to the original certificate by means of integrating certificate specific data into the institutional attribute, so that manipulated certificates, which contain transferred institutional attributes, can be identified.

The risks described in [6] are therefore significantly reduced by applying the inventive method.

In view of [6], Risk#1 ("Who do we trust, and for what?"), trust received by the elements of the public key infrastructure are combined by using the inventive method with the trust the institution has in itself. It is important to note that the additional link in the security chain is not linked serially but in parallel to existing links of the chain. In case that an element of the public key infrastructure fails then the security chain still holds by means of the inventive measures.

In case that the institution uses a pair of keys, which are securely stored in separate departments then the trust in the institution itself can further be increased.

In view of [6], Risk#4 ("Which JOHN ROBINSON is he?"), it has been explained that among several persons bearing the same name (e.g. OLIVIER HOLDER i.e. JOHN ROBINSON) the correct person can easily be identified by means of the decrypted relational data, which comprise for example the client number and further details of the agreement between the institution and the certificate holder or a further institution the certificate holder is working for. By means of the inventive method the institution can therefore reliably answer the extended question "Which OLIVIER HOLDER is he and what is our relation to this OLIVIER HOLDER?".

Since the relational data are encrypted in the certificate a third party or the certificate holder will not have access to this relational data. The third party will not even have access to one of the keys of the institute's key pair. A certificate holder can therefore have institutional attributes of different institutions integrated in his certificate and still maintain secrecy, since an institution can decrypt relational data only with the corresponding key.

The certificate remains therefore open to the public except for encrypted relational data integrated therein.

In a preferred embodiment of the invention decrypted relational data is used to verify data of a calling client which data is stored in a directory of the institution. A mapping list is no longer required since data required e.g. for mapping the name of a client to a client number is already contained in the relational data i.e. the institutional attribute. The system on the institute's side is therefore simplified. A manipulation of the directory can easily be detected during the described verification process, so that integrity of data at least in the used parts of the directory is always established.

The inventive method therefore allows to significantly improve overall system reliability, in particular authentication and data integrity, by selectively simplifying the open cryptographic communications system through selective integration of closed modules.

In a different embodiment of the invention an institution, such as a governmental authority, may also integrate relational data into a certificate, which is based on approved information. The institution confirms correctness of this information by signing the unencrypted relational data with the private key of the institution.

Any third party, particularly the attribute integrating certification authority, can verify said signature contained in the certificate by means of the published public key of the institution whenever the confirmed information needs to be proven.

In a preferred embodiment the information may concern the fact that the certificate holder possesses additional certificates. The institution or an attribute integrating certification authority may verify and confirm correctness of the additional certificates by generating and signing corresponding unencrypted relational data with the private key of the institution.

In order to integrate the encrypted or signed relational data in the certificate said relational data is sent to the concerned authority of the public key infrastructure which adds the received encrypted or signed relational data and reissues the certificate.

The process of generating, encrypting, transmitting and integrating new relational data into a certificate as well as reissuing and sending the enhanced certificate to the institution and to the certificate holder can take place during the same session established between the certificate holder and the institution. The update of the certificate can therefore automatically be executed in a short time period without any noticeable effort by the concerned parties. The insignificant efforts required for updating certificates stand however in relation to large efforts required instead for maintaining integrity of data of the institution's databases.

The certificate is preferably stored in a token which is carried by the certificate holder. In case that the token comprises a biometric input device it could be assured that only the certificate holder could use the token.

BRIEF DESCRIPTION OF THE DRAWINGS

Some of the objects and advantages of the present invention have been stated, others will appear when the following description is considered together with the accompanying drawings, in which.

DETAILED DESCRIPTION OF THE PREFERRED EMBODIMENTS

Figure 1:
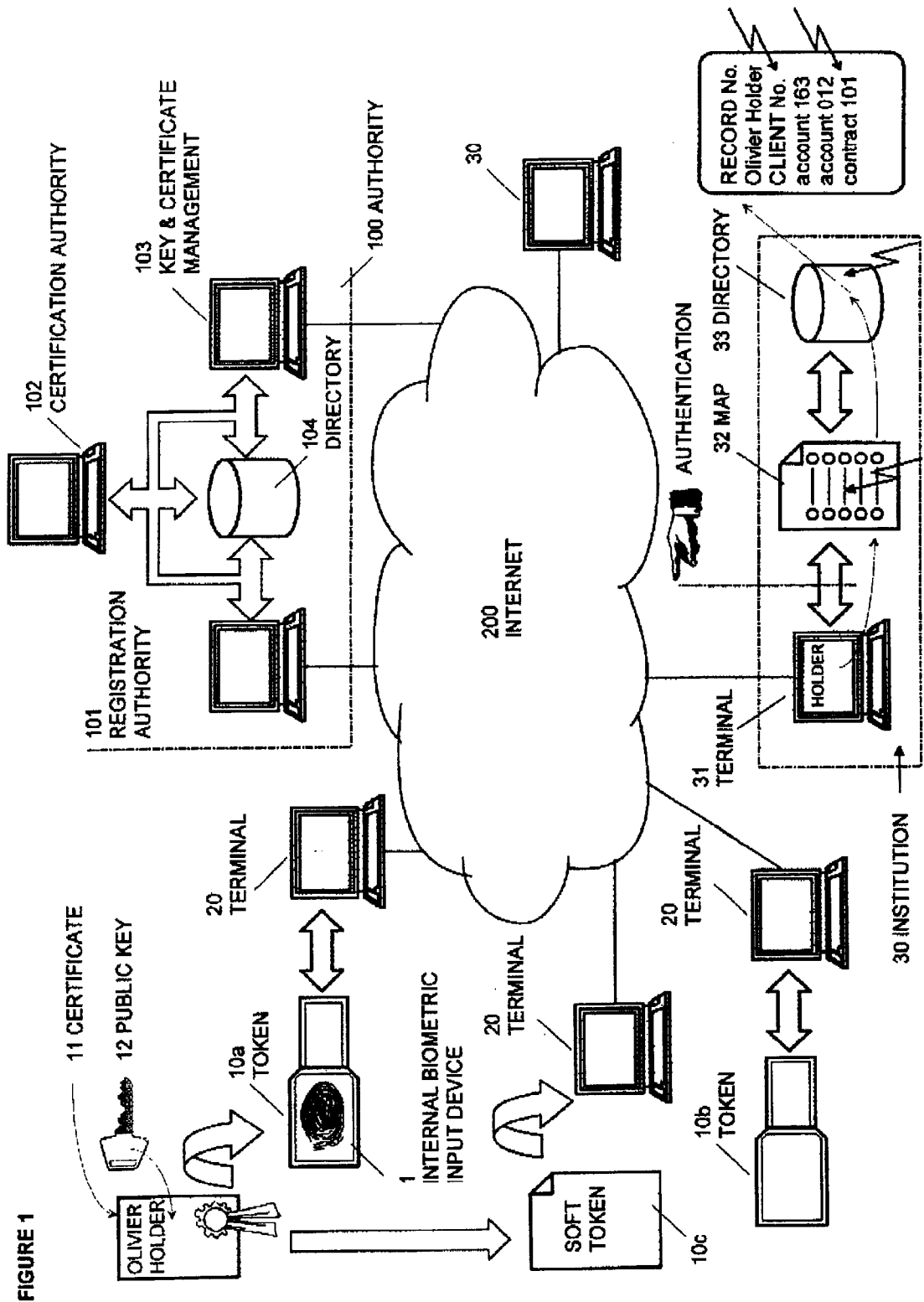
FIG. 1 shows a known public key infrastructure operating with conventional certificates.

FIG. 1 shows a known public key infrastructure operating with conventional certificates. A person, e.g. OLIVIER HOLDER, may apply at an authority 100 of the public key infrastructure for a certificate 11. The authority 100, which over the Internet 200 is connected to terminals 20, 30 of users of the public key infrastructure, normally consists of a registration authority 101, a certification authority 102, a key and certificate management unit 103 and a database 104 containing the directory of the public key infrastructure. The applicant, OLIVIER HOLDER, may use a soft or a hard token 10a, 10b, 10c.

Credentials submitted to the registration authority 101 preferably comprise biometric data which allow strong authentication of an applicant. An applicant therefore preferably uses a token 10a which allows to read biometric data by means of a biometric input device 1. As described in the European Patent Application No. 01810513.0 biometric data may be read during registration only or also thereafter for each transaction initiated by the certificate holder based on the certificate.

The issued certificate 11, which comprises a public key 12 can then be used as described above or in [3], pages 5–12. OLIVIER HOLDER may for example present his certificate 11 on-line over the Internet 200 at an institution 30, for example a bank institute in order to initiate a transaction such as a transfer of money from his account to an account of third parties.

In the known infrastructure the institution 30 needs to trust the certificate 11 i.e. the certification authority 102 in order to authenticate OLIVIER HOLDER, the holder of the transmitted certificate 11. By means of a map or a mapping list 32 the institute relates the authenticated person to a record stored in a directory 33, which contains the data of the client, OLIVIER HOLDER. In case that the directory 33 contains data of different persons with the name OLIVIER HOLDER then the serial number of the certificates 11 may be used for the mapping process.

The risks involved in this procedures have been described above. Institutions 30 may distrust external authorities, such as the certification authority 102, particularly for transactions concerning large amounts of money. In addition institutions 30 should be aware of risks within their own premises. As detailed above attackers could intrude the computer systems of the institutions 30 and manipulate the mapping list 32 and/or the directory 33.

Figure 2:
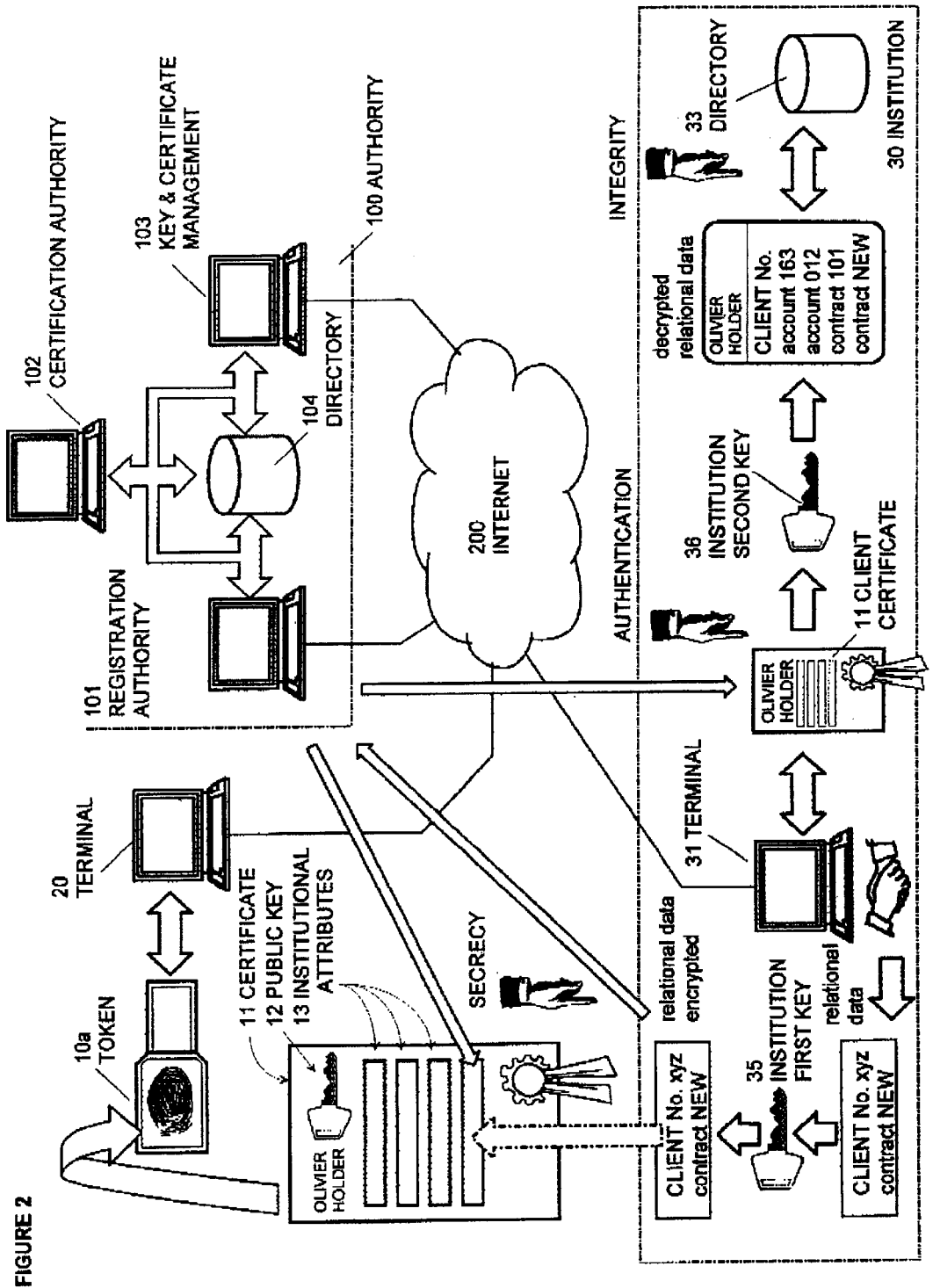
FIG. 2 shows a public key infrastructure operating according to the inventive method and FIG. 3 shows a certificate extended with attributes.

FIG. 2 shows a public key infrastructure operating according to the inventive method. In the given example the certificate holder, OLIVER HOLDER, uses a token 10a comprising a biometric input device. Other means, such as a soft token (see FIG. 1, 10c), for storing the certificate 11 could be used as well.

As shown in FIG. 2 the certificate held by OLIVIER HOLDER is an extendable certificate 11 such as a certificate specified according to ITU recommendation X.509 version 3 which is described in [3], pages 40–42.

According to the present invention an institution 30 may allow the certificate holder to base future transactions or system access on his certificate 11. Based on security regulations implemented the institution 30 will preferably verify that the person who is presenting the certificate 11 is the actual owner for whom the certificate 11 had been issued. The institution 30 will further verify whether the certificate holder relates to a registered user or contract and will demand corresponding proof. This initial verification can take place in a know manner, e.g. by transferring passwords or keywords taken from a list over a secure channel.

According to the present invention data relating to the client of the institution 30 are securely stored in the certificate 11 thus avoiding the use of a mapping list.

For this purposes the institution preferably uses and securely stores a secret key or a key pair which is designed for encrypting and decrypting data. Based on an agreement or a contract closed between the holder of the certificate 11 and the institution 30, corresponding relational data are generated.

Then said relational data are encrypted with the institution's secret key or the first key 35 of said key pair. Subsequently the encrypted relational data are integrated into the certificate 11.

In order to integrate the encrypted relational data into the certificate 11 said encrypted relational data is sent to the authority 100 of the public key infrastructure which adds the received data as an institutional attribute and reissues the certificate 11. Subsequently the certificate is transferred to the certificate holder and preferably as well to the institution 30.

The process of generating, encrypting and integrating the relational data as well as reissuing the certificate 11 can performed within minutes during a session between a calling certificate holder and the institution 30.

At a later stage, whenever the certificate holder contacts the institution in order to initiate a transaction based on an agreement between the certificate holder and the institution 30, encrypted relational data is read from the certificate 11, decrypted by means of the secret key or the second key 36 of said key pair of the institution 30.

This enables the institution to identify and authenticate a certificate holder much stronger. In case that the certificate passes standard authentication, it is established that the certificate belongs for example to a OLIVIER HOLDER. Decrypting the encrypted relational data contained in the certificate confirms the identity of OLIVIER HOLDER, and indicates what relations exist between OLIVIER HOLDER and the institution. In case that several persons with the name HOLDER are registered at the institution, it is simultaneously established which one of these persons is concerned.

In a further step the decrypted relational data is preferably used to verify data stored in a directory 33 of the institution 30. A mapping list is no longer required since data required for mapping the name of a client to a client number is already contained in the relational data i.e. the institutional attribute.

The encryption and decryption of relational data by the institution 30 can be performed by means of a single secret key (see [3], page 4) since the encrypted relational data corresponds to a message which is written and read by the same party i.e. the institution 30 only and a transfer of the secret key across the network from a sender to receiver therefore is not required.

In order to increase security internally in the institution an asymmetric key pair such as a private/public key pair is preferably used with the first key, which for example corresponds to a private key held in a registration department, where relational data are encrypted, and the second key, which corresponds to a "public" key, held securely stored in another department, for example where transactions are handled.

Although the term public key is used for the second key, this second key is preferably securely stored in a department of the institution.

Since the relational data are contained in encrypted form in the certificate a third party or the certificate holder will not have access to this relational data. A third party or the certificate holder will not even have access to one of the keys of the institute's key pair. A certificate holder can therefore have institutional attributes of different institutions integrated in his certificate and still maintain secrecy, since an institution can decrypt relational data only with the corresponding key.

In order to prevent transfer of encrypted relational data i.e. of an institutional attribute from an original certificate to a certificate used by an attacker, said encrypted relational data are preferably strongly linked to the original certificate by means of integrating certificate specific data into the institutional attribute, so that manipulated certificates, which contain transferred institutional attributes, can be identified.

For this purpose the encoded relational data are preferably combined with a data segment i.e. a certificate identifier, which is suitable to identify the certificate.

Figure 3:
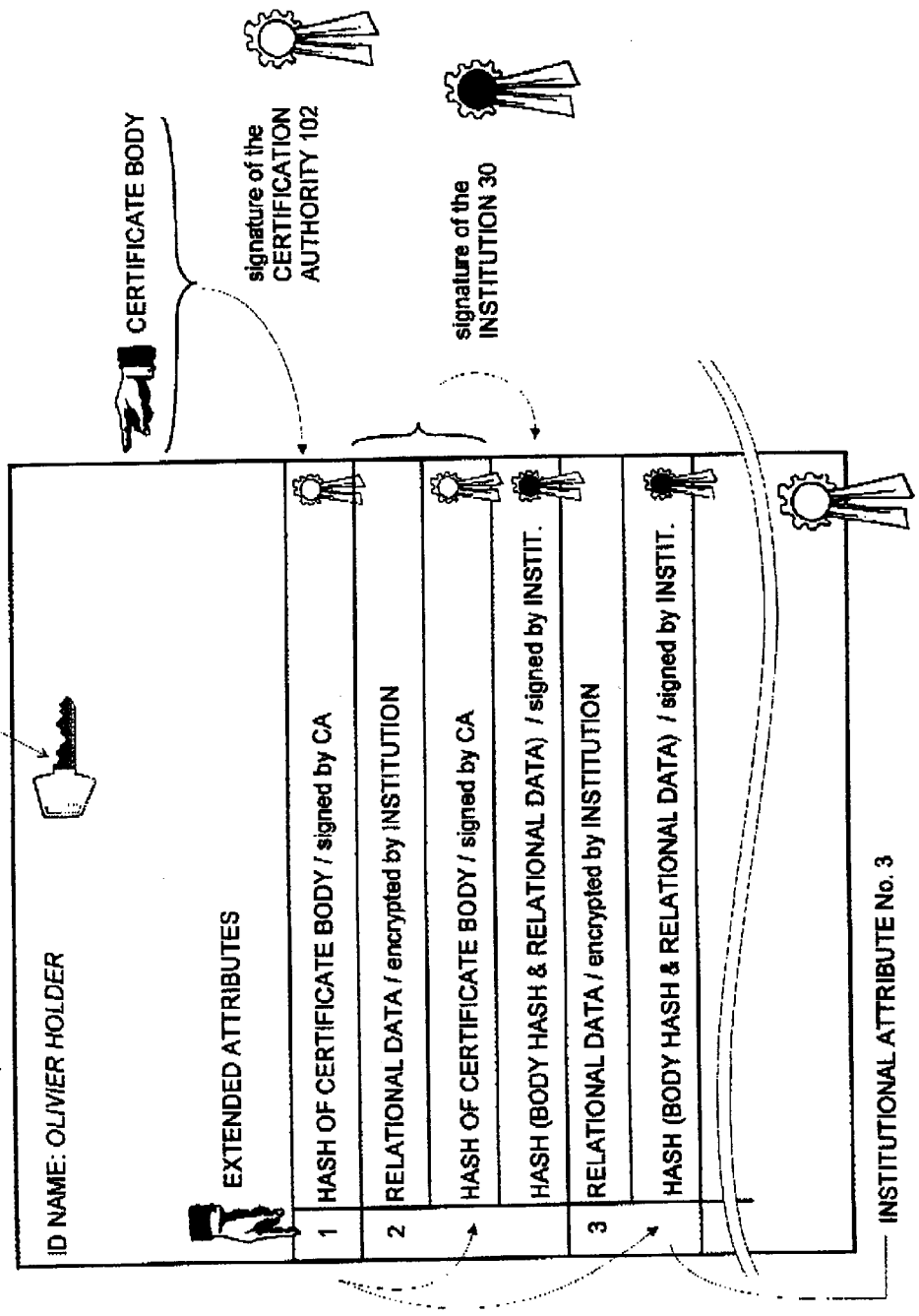

As shown in FIG. 3 preferably the hash of the certificate body, which has been signed by the certification authority 102, is used as certificate identifier. In order to link the certificate identifier to the encoded relational data, a hash of the combination of the encoded relational data and the certificate identifier is built, signed by the institution and added to the institutional attribute. When receiving the certificate at a later stage the institution can easily verify that the certificate identifier belongs on the one hand to the encrypted relational data and on the other hand to the presented certificate thus closing the link between the institutional attribute and the presented certificate.

FIG. 3 shows the certificate 11 extended with three attributes 1) the hash of the certificate body signed by the certification authority 102,
2) a first institutional attribute comprising relational data encrypted by the institution 30, the, hash of the certificate body signed by the certification authority 102 and the hash of the combination of the encrypted relational data and the hash of the certificate body, said hash of this combination signed by the institution 30 and
3) a second institutional attribute comprising relational data encrypted by the institution 30 and the hash of the combination of the encrypted relational data and the hash of the certificate body, said hash of this combination signed by the institution 30.

In the second institutional attribute the hash of the certificate body is not included since this hash is included in the certificate 11 as attribute.

In a different embodiment of the invention an institution 30, such as a governmental authority, may also integrate relational data into a certificate 11, which is based on information the institution has approved. The institution 30 confirms correctness of this information by signing the unencrypted relational data with the private key of the institution 30.

Any third party can verify said signature contained in the certificate by means of the corresponding published public key of the institution 30 whenever the confirmed information needs to be proven. In this case the institution 30 preferably uses a different key set namely the key set for which a certificate was issued and published by an authority 100 of the public key infrastructure.

In a preferred embodiment the information may concern the fact that the certificate holder possesses additional certificates. The institution 30 which can be the certificate issuing certification authority itself, may verify and confirm correctness of the additional certificates by signing the resulting unencrypted relational data with the private key. In order to integrate the signed relational data in the certificate said relational data is sent to the concerned authority of the public key infrastructure which adds the received data and reissues the certificate as described above.

The certificate 11 incorporates in this case two or more certificates which at least for the institution 30 but also for third parties may considerably raise the trust into the certificate 11.

Although the present invention has been described in detail with reference to preferred embodiments, persons having ordinary skill in the art will appreciate that various modifications and different implementations may be made without departing from the spirit and scope of the invention.

REFERENCES

[1] Richard C. Dorf, THE ELECTRICAL ENGINEERING HANDBOOK, $2^{nd}$ Edition, CRC-Press, Boca Raton 1997
[2] U.S. Pat. No. 4,405,829 (Rivest et al.)
[3] Marc Branchaud, A SURVEY OF PUBLIC-KEY INFRASTRUCTURES, Department of Computer Science, Mc Gill University, Montreal 1997
[4] U.S. Pat. No. 6,202,151 B1 (Musgrave et al.)
[5] PKCS#10 Standard, Certification Request Syntax Standard, RSA Laboratories May 2000 (available under http://www.rsasecurity.com/rsalabs/pkcs/index.html)
[6] Carl Ellison and Bruce Schneier, Ten Risks of PKI; What You're not Being Told about Public Key Infrastructure, Computer Security Journal, Volume XVI, Number 1, Computer Security Institute 2000
[7] A. Menezes, P. van Oorschot, S. Vanstone, HANDBOOK OF APPLIED CRYPTOGRAPHY, CRC-Press, Boca Raton 1997

What is claimed is:

1. Method for securing data relating to users of a public key infrastructure who may present certificates (11) at an institution (30) in order to initiate transactions, comprising the steps of
   a) providing cryptographic means to the institution (30) which are designed for encrypting and decrypting data,
   b) generating relational data based on an agreement between a certificate holder and the institution (30),
   c) generating a secret key or a key pair (35, 36) which is designed for encrypting and decrypting data and which is used and securely stored by the institution (30), d) encrypting the relational data by the institution (30) with said cryptographic means, e) encrypting the relational data with the secret key or the first key of said key pair (35, 36) of the institution (30), f) integrating the encrypted relational data into the certificate (11) of said certificate holder, g) decrypting said encrypted relational data contained in the certificate (11) of said certificate holder with said cryptographic means whenever a transaction is to be performed based on said agreement between the certificate holder and the institution (30) and h) decrypting said encrypted relational data contained in the certificate (11) of said certificate holder by means of the secret key or the second key of said key pair (35, 36) of the institution (30) whenever a transaction is to be performed based on said agreement between the certificate holder and the institution (30).

2. Method according to claim 1, comprising the steps of binding the relational data securely to the corresponding certificate and by combining the encrypted relational data with a certificate identifier, such as the hash of the certificate body, which has been signed by the certification authority (102).

3. Method according to claim comprising the steps of building a hash of the combination of the encoded relational data and the certificate identifier and signing the combined data by the institution (30).

4. Method according to claim 1, comprising the steps of sending the encrypted or combined and signed relational data to the authority (101, 102) of the public key infrastructure which has issued the certificate (11), said authority (101, 102) adding the received encrypted relational data to the certificate (11) and reissuing said certificate (11).

5. Method according to claim 1, comprising the steps of transferring the reissued certificate (11) which contains the encrypted or signed relational data to the certificate holder and/or to the institution (30) preferably during the session the encrypted or signed relational data was received by the authority (101, 102).

6. Method according to claim 1, comprising the steps of securely storing the keys (35, 36) of the key pair, which are used for encrypting and decrypting relational data, separated from each other in different locations or departments of the institution (30).

7. Method according to claim 1, comprising the steps of securely storing the secret key, which is used for encrypting and decrypting relational data, at the institution (30).

8. Method according to claim 1, comprising the steps of comparing the decrypted relational data with data stored in a directory (33) of the institution (30) in which data of clients and relations between the institution (30) and said clients are stored in order to check integrity of said data.

9. Method according to claim 1 comprising the steps of integrating encrypted or signed relational data in the certificate individually for more than one agreement or confirmed information.

10. Method for securing data relating to users of a public key infrastructure who may present certificates (11) at an institution (30) in order to initiate transactions and prove information corresponding to said data, comprising the steps of a) providing cryptographic means to the institution (30) which are designed for encrypting and decrypting data, b) generating relational data based on an agreement between a certificate holder and the institution (30)

c) encrypting the relational data by the institution (30) with said cryptographic means, d) integrating the encrypted relational data into the certificate (11) of said certificate holder, e) decrypting said encrypted relational data contained in the certificate (11) of said certificate holder with said crypto graphic means whenever a transaction is to be performed based on said agreement between the certificate holder and the institution (30), f) generating additional relational data based on information related to a certificate holder, said information being confirmed by the institution (30) by g) securely transferring said additional relational data to the certification authority (102) and h) integrating the signed additional relational data into the certificate (11) of said certificate holder.

11. Method according to claim 1 comprising the steps of generating additional relational data based on one or more additional certificates, the certificate holder has received from other authorities of the public key infrastructure, and integrating said additional relational data signed and/or encrypted into the certificate (11).

12. Method according to claim 1 comprising the steps of storing the certificate (11) in a token (10) which preferably comprises a biometric input device (1).

13. Method according to claim 1 using an extendable certificate (11) such as a certificate specified according to ITU recommendation X.509 version 3.

* * * * *